United States Patent
Küper et al.

(10) Patent No.: US 6,523,342 B2
(45) Date of Patent: Feb. 25, 2003

(54) METHOD AND SYSTEM FOR THE CATALYTIC AFTERTREATMENT OF THE EXHAUST GAS OF AN INTERNAL-COMBUSTION ENGINE

(75) Inventors: Paul Küper, Wiernsheim (DE); Tom Brahner, Ingolstadt (DE)

(73) Assignees: Dr. Ing. h.c.F. Porsche Aktiengesellschaft, Stuttgart (DE); Audi AG, Ingolstadt (DE); Bayerische Motoren Werke Aktiengesellschaft, Munich (DE); DaimlerChrysler AG, Stuttgart (DE); Volkswagen AG, Wolfsburg (DE)

( * ) Notice: Subject to any disclaimer, the term of this patent is extended or adjusted under 35 U.S.C. 154(b) by 0 days.

(21) Appl. No.: 09/925,025

(22) Filed: Aug. 9, 2001

(65) Prior Publication Data

US 2002/0023429 A1 Feb. 28, 2002

(30) Foreign Application Priority Data

Aug. 9, 2000 (DE) .......................... 100 38 724

(51) Int. Cl.⁷ ................................. F01N 3/10
(52) U.S. Cl. ............... 60/300; 60/274; 60/289; 60/303; 60/306
(58) Field of Search ............ 60/274, 284, 289, 60/303, 300, 306

(56) References Cited

U.S. PATENT DOCUMENTS

| | | | |
|---|---|---|---|
| 3,751,914 A | * 8/1973 | pollock | 60/284 |
| 4,141,213 A | * 2/1979 | Ross | 431/285 |
| 4,502,278 A | * 3/1985 | Stark | 60/303 |
| 5,253,475 A | * 10/1993 | Kabasin | 60/277 |
| 5,410,872 A | 5/1995 | Adamczyk, Jr. et al. | |
| 5,425,233 A | 6/1995 | Ma et al. | |
| 5,457,957 A | 10/1995 | Härtel et al. | |
| 5,551,231 A | * 9/1996 | Tanaka et al. | 60/289 |
| 5,603,216 A | * 2/1997 | Guile et al. | 60/288 |
| 5,609,021 A | 3/1997 | Ma | |
| 5,613,360 A | 3/1997 | Iwai et al. | |
| 5,685,144 A | 11/1997 | Ma | |
| 5,746,049 A | * 5/1998 | Cullen et al. | 60/289 |
| 5,802,844 A | 9/1998 | Lee et al. | |
| 5,814,283 A | * 9/1998 | Matuoka et al. | 60/300 |
| 6,023,929 A | * 2/2000 | Ma | 60/295 |
| 6,029,441 A | * 2/2000 | Mizuno et al. | 60/276 |
| 6,089,015 A | * 7/2000 | Strehlau et al. | 60/274 |
| 6,293,094 B1 | * 9/2001 | Schmidt et al. | 60/284 |
| 6,325,054 B1 | * 12/2001 | Wenger et al. | 60/274 |

FOREIGN PATENT DOCUMENTS

| | | |
|---|---|---|
| DE | 2 129 023 | 12/1972 |
| DE | 2 254 895 | 3/1973 |
| DE | 19804429 A1 | 8/1999 |
| EP | 0697242 A1 | 2/1996 |
| GB | 2278299 A | 11/1994 |
| WO | WO 92/22734 | 12/1992 |
| WO | WO 93/07365 | 4/1993 |
| WO | WO 97/25525 | 7/1997 |

* cited by examiner

Primary Examiner—Thomas Denion
Assistant Examiner—Diem Tran
(74) Attorney, Agent, or Firm—Crowell & Moring LLP

(57) ABSTRACT

The present invention relates to a method and a corresponding system for catalytic aftertreatment of the exhaust gas of an internal-combustion engine. Two spatially separate catalyst devices are provided in the exhaust gas system. The first of these catalyst devices is arranged in a position close to the engine, and the second catalyst device is arranged in a position away from the engine. An exothermal reaction is caused to take place during warm-up for heating the second catalyst device.

8 Claims, 2 Drawing Sheets

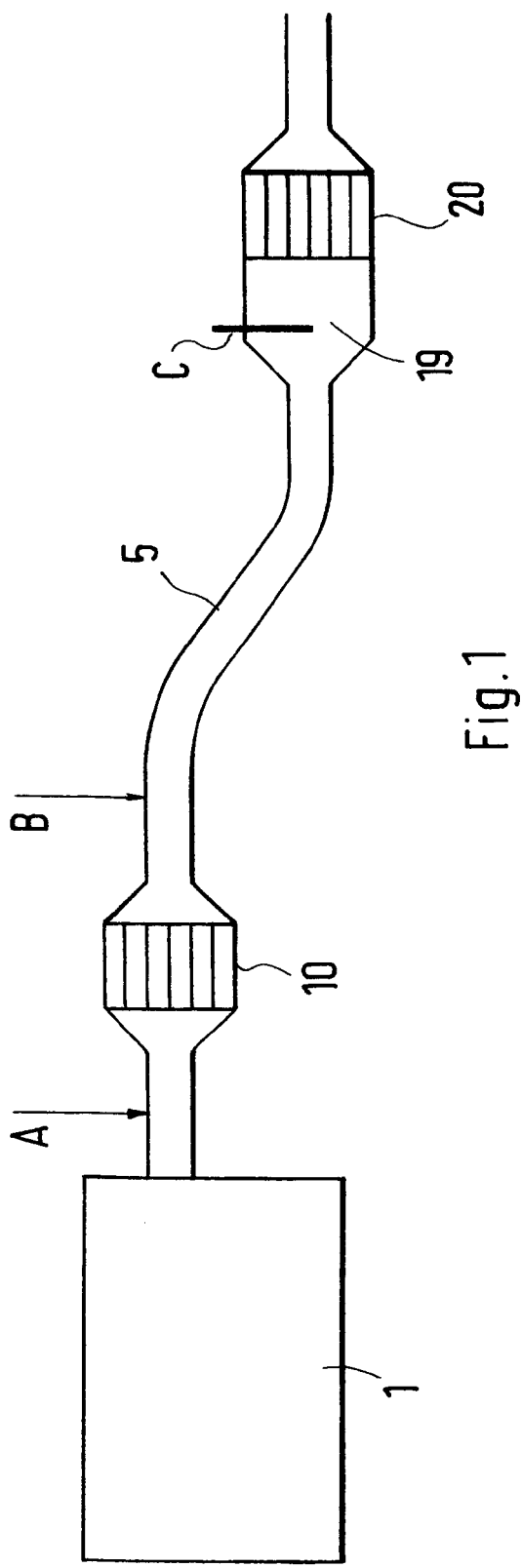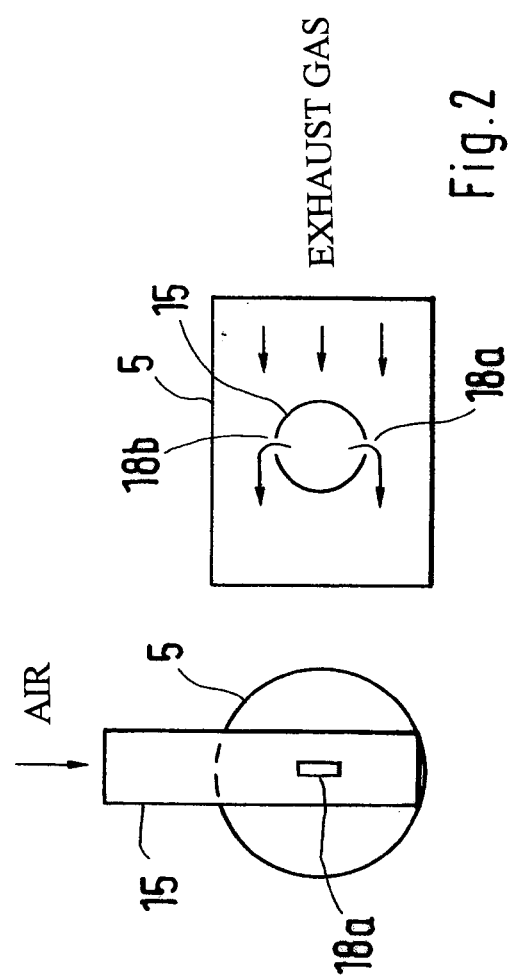

METHOD AND SYSTEM FOR THE CATALYTIC AFTERTREATMENT OF THE EXHAUST GAS OF AN INTERNAL-COMBUSTION ENGINE

This application claims the priority of German application 100 38 724.1, filed Aug. 9, 2000, the disclosure of which is expressly incorporated by reference herein.

BACKGROUND AND SUMMARY OF THE INVENTION

The present invention relates to a particular method and a particular system for catalytic aftertreatment of internal-combustion engine exhaust gas.

Reducing pollutants in the exhaust gas of a motor vehicle internal-combustion engine during an engine cold start and an engine warm-up is most promising for reducing pollutants when aftertreating the exhaust gas. Among other methods known for this purpose is a method in which, during a cold start, a combustible air/fuel mixture is generated in the exhaust gas train. The heating value of the exhaust gas is utilized to provide for rapid heating of the pollutant-converting catalysts to their starting or usage temperature. This takes place because the combustible air/fuel mixture is ignited again at an appropriate point in direct proximity to the catalyst.

A method for afterburning exhaust gas to rapidly heat a catalytic system is suggested in International Patent Document WO 93/07365. The corresponding system has two catalysts. A combustion chamber which has an ignition aid is arranged between the two catalysts. After cold starting the engine, the engine is operated in a rich manner, secondary air is admixed in front of the catalyst system, and the combustible exhaust gas/air mixture is ignited in the combustion chamber and burnt as completely as possible. The heat of the reaction is used for rapidly heating the catalyst. During the heating phase, exhaust gas in the combustion chamber is significantly warmer than the inflowing exhaust gas.

The principal disadvantage of this system is that the system may cool again after the heating phase, and the catalyst temperature may fall below the light-off temperature until the afterflowing exhaust gas is sufficiently warm to keep the overall system above the light-off temperature. Another disadvantage is that, as a result of the considerable richness required, crude emissions are significantly increased. Until ignition of the exhaust gas takes place, crude exhaust gas reaches the environment without any conversion.

A suggested remedy has been to arrange an HC-adsorber instead of the first catalyst in front of the combustion chamber. As a result of this arrangement, HC constituents are intermediately stored, but the second carrier disadvantageously cools down after the heating phase, and loses its activity for a certain interval, until the inflowing exhaust gas has reheated the system to the operating temperature. Furthermore, in the desorption phase, HC reaches the environment from the adsorber without any oxidation in the second monolith.

If the heating phase is extended in order to prevent cooling of the catalyst or catalysts behind the combustion chamber, there is a risk that the catalyst or catalysts may be damaged.

German Patent Document DE 198 04 429 A1 describes a method for rapidly reaching the activation temperature of a catalyst of an applied-ignition internal-combustion engine; this catalyst is arranged close to the engine.

Additional prior art includes International Patent Documents WO 97/25525, WO 93/07365, and WO 92/22734, European Patent Document EP 0 697 242, U.S. Pat. Nos. 5,609,021, 5,685,144, 5,613,360, 5,410,872, and 5,425,233, and British Patent Document GB 2 278 299 A.

It is an object of the present invention to provide an improved method and an improved system for catalytic aftertreatment of internal-combustion engine exhaust gas which permit faster and more efficient heating of the catalyst system.

According to the invention, catalytic aftertreatment of internal-combustion engine exhaust gas is performed by first and second spatially separate catalyst devices provided in an exhaust gas system, with the first catalyst device arranged in a position close to the engine, and the second catalyst device arranged in a position away from the engine. A heating measure, which has an exothermal reaction for heating the second catalyst device, is caused to take place. This reaction may take place in a reaction chamber arranged in front of the second catalyst device.

The invention permits heating of the catalytic emission control system of an internal-combustion engine. The system has a main catalyst arranged close to the engine and a starting catalyst arranged away from the engine. Air is fed to the exhaust gas and is reacted in front of the catalyst away from the engine by applied ignition. Heating takes place during the internal-combustion engine warm-up phase because, during this time period, the catalysts do not have a temperature sufficient for oxidation, for example, of hydrocarbons and carbon monoxide and for reduction, for example, of nitrogen oxides. The special characteristic of the system is the separation of the function of rapidly heating a starting catalyst away from the engine and from the function of a main catalyst which, as a result of its operation close to the engine, reaches the light-off temperature early. This separation permits a shortening of the heating time so that damage to the starting catalyst is avoided as a result of this heating measure.

Advantageous further developments and improvements of the invention are reflected in the claims.

According to one preferred feature of the invention, the heating procedure has a first phase with an exothermal reaction for heating the second catalyst device to a temperature above the light-off temperature.

According to another preferred feature of the invention, the heating procedure has a second phase without the exothermal reaction for cooling to the light-off temperature. In this case, the engine is operated stoichiometrically or in a lean manner. As a result of shortening the heating time of the heating procedure in this way, thermal stressing of the second catalyst device can be considerably reduced.

According to another preferred feature of the invention, the mixture is adjusted such that exhaust gas coming from the engine contains combustible constituents, and air is fed to the exhaust gas with the combustible constituents in the emissions system in order to obtain an ignitable mixture.

According to another preferred feature of the invention, the air is fed at a position upstream of the first catalyst device.

According to another preferred feature, the air is fed at a position downstream of the first catalyst device. This has the advantage that the first catalyst device is better protected against unintentional combustion.

According to another preferred feature, at least two bends are provided in the exhaust gas flow between the position at which the air is fed and the position at which the exothermal reaction takes place. This ensures good mixing of the combustible constituents with the secondary air.

According to another preferred feature, a reaction chamber is set up in front of the second catalyst device. The exothermal reaction is initiated in the reaction chamber by way of an ignition device, preferably a glow device. This ignition device may, for example, be a glow plug or a special spark plug. A catalytically coated glow plug is particularly advantageous, so that the ignition temperature and the ignition energy can be lowered.

According to another preferred feature, the ignition device is essentially arranged centrally in the reaction chamber.

According to another preferred feature, the second catalyst device is provided with a multi-constituent integral coating. The integral coating has a catalytic constituent and an adsorbing constituent for hydrocarbons. The temperature course in the second catalyst device is such that the temperature window between the desorption start and the start of the catalytic conversion is closed. In this HC-adsorber arrangement, on the one hand, the HC-fraction from the exhaust gas can be utilized for exhaust gas afterburning and, on the other hand, the unburnt fraction is intermediately stored in the HC-adsorber which follows and, during desorption, oxidizes simultaneously on the integral coating. The catalyst close to the engine heats up rapidly and reaches its light-up temperature before the integral coating has cooled down.

According to another preferred feature, a third catalyst device is provided upstream directly in front of the reaction chamber of the second catalyst device.

According to yet another preferred feature, the third catalyst device is provided with a multi-constituent integral coating which has a catalytic constituent and an adsorbing constituent for hydrocarbons.

According to still another preferred feature, the reaction chamber is constructed in a cylindrical shape. As a result, an optimal flame front construction can be achieved.

Embodiments of the invention are illustrated in the drawings and are explained in detail below.

BRIEF DESCRIPTION OF THE DRAWINGS

FIG. 1 is a schematic representation of a system according to a first preferred embodiment of the present invention;

FIG. 2 is an enlarged cutout of the air introducing device of the system according to FIG. 1.

DESCRIPTION OF THE PREFERRED EMBODIMENTS

Figure 3:
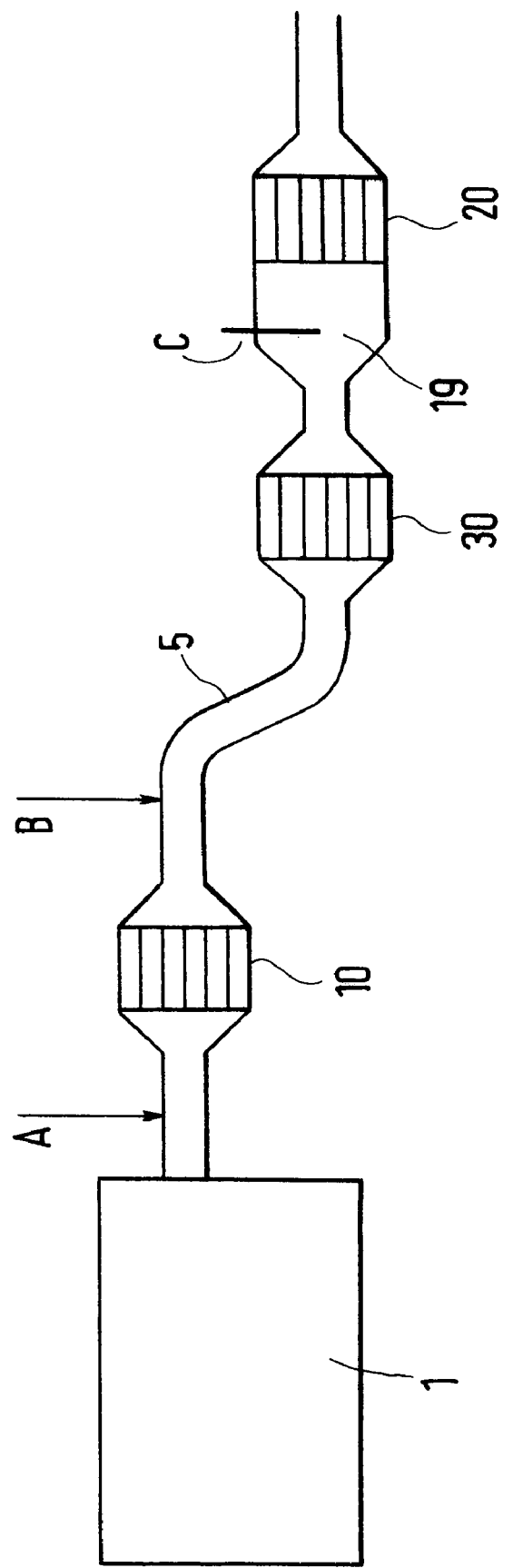
FIG. 3 is a schematic representation of a system according to a second preferred embodiment of the present invention.

In the figures, the same reference numbers indicate identical elements or elements which have the same function.

In FIGS. 1 to 3, reference number 1 indicates an internal-combustion engine; reference number 10 indicates a first catalyst device; reference number 20 indicates a second catalyst device; reference number 5 indicates an exhaust pipe with at least two deflections; reference characters A and B indicate air feeding positions; reference character C indicates an ignition device; reference number 19 indicates a reaction chamber; reference number 15 indicates a pipe for feeding air; and reference characters 18 and 18b indicate slots.

FIG. 1 is a schematic representation of a system according to a first preferred embodiment of the present invention.

In the first embodiment represented in FIG. 1, a first catalyst device 10 is arranged in direct proximity to the internal-combustion engine 1. This first catalyst device 10 is the main catalyst.

Downstream of the first catalyst device 10 and connected by the exhaust pipe 5, a second catalyst device 20 is provided which has a combustion chamber arranged directly in front of it. An ignition device C is situated at a central location in the combustion chamber.

During operation of this first embodiment, an exothermal reaction for heating the second catalyst device 20 to its light-up temperature is caused to take place in the reaction chamber 19 during the warm-up phase. This takes place particularly since the exhaust gas emerging from the internal-combustion engine 1 has combustible constituents in the form of unburnt fuel, for example, as a result of a late injection.

Air is additionally fed to the exhaust gas, at position A, at position B, or at both positions, in order to make the combustible constituents which are situated in the exhaust gas ignitable. An optimal ignitability is obtained in the stoichiometric case; that is, $\lambda=1$ to approximately $\lambda=1.15$. In the case of this operation, immediately after a cold start, the ignition device C is switched on by a control device, which is not shown, and which, for example, in the case of a glow plug, is a glow condition. As a result, the combustible mixture in the reaction chamber 19 is ignited at a certain interval before the second catalyst device 20.

This has the result that the combustible exhaust gas constituents have an exothermal secondary reaction in the combustion chamber, and the second catalyst device 20 very rapidly reaches its light-off temperature during the warm-up phase of the engine.

When the first catalyst device 10 has reached its light-off temperature and is fully operative, the ignition device C and the secondary air supply can be switched off. The $\lambda$-value can also be arbitrarily adjusted corresponding to the engine conditions.

Furthermore, after switching the heater off, the heat stored in the second catalyst is utilized for bridging the residual time to the complete light-off of the main catalyst close to the engine. In this way, the heating time can be shortened.

FIG. 2 is an enlarged cutout of the air introduction device of the system represented in FIG. 1.

FIG. 2 shows an example as to how the secondary air can expediently be introduced into the exhaust pipe 5. In this first embodiment, this takes place by way of a pipe 15 which is essentially introduced perpendicular to the flow direction of the exhaust gas into the exhaust pipe 5. The pipe 15 has slots 18a and 18b in its shell. The air can emerge from the pipe 15, through slots 18a, 18b, and arrive in the exhaust pipe 5, where it mixes with the exhaust gas flowing past. According to the actual flow conditions, the position and the number of slots 18a, 18b can be adapted or optimized.

Between the point of introduction of the secondary air and the entry into the combustion chamber, two or more deflections of the exhaust pipe are expedient for good mixing of the exhaust gas and the secondary air (compare FIGS. 1 and 3).

FIG. 3 is a schematic representation of a system according to a second preferred embodiment of the present invention.

In the second embodiment illustrated in FIG. 3, a third catalyst device 30 is provided directly in front of the reaction chamber 19. The purpose of the third catalyst device 30 is to prevent pulsations during the warm-up phase which are caused by the reaction chamber 19.

In this second embodiment, a two-constituent integral coating is additionally provided in the second catalyst device 20. This integral coating, on the one hand, has an HC-adsorbing constituent and, on the other hand, has a catalytic constituent for HC, so that hydrocarbons occurring immediately after starting are first bound and are then catalytically converted after the light-off temperature of the second catalyst device 30 has been reached.

Although the present invention was described above by way of preferred embodiments, it is not limited thereto and can be modified in many different fashions.

In particular modifications, the feeding of air can take place at any point between the first and second catalysts. An arbitrary ignition device may also be used. Furthermore, the reaction chamber is optional.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A method for catalytic aftertreatment of exhaust gas of an internal-combustion engine, comprising:
   providing first and second spatially separate catalyst devices in an exhaust gas system, the first catalyst device being arranged in a position close to the engine, and the second catalyst device being arranged in a position away from the engine, and
   causing a heating measure which has an exothermal reaction for heating the second catalyst device to take place,
   wherein a mixture is adjusted such that the exhaust gas coming from the engine has combustible constituents, and wherein air is supplied to the exhaust gas with the combustible constituents in the exhaust gas system in order to obtain a combustible mixture,
   wherein the air is fed at a position upstream of the first catalyst device, and
   wherein at least two bends are provided in a flow of the exhaust gas between the position at which the air is fed and a position at which the exothermal reaction takes place.

2. A method for catalytic aftertreatment of exhaust gas of an internal-combustion engine, comprising:
   providing first and second spatially separate catalyst devices in an exhaust gas system, the first catalyst device being arranged in a position close to the engine, and the second catalyst device being arranged in a position away from the engine, and
   causing a heating measure which has an exothermal reaction for heating the second catalyst device to take place,
   wherein a mixture is adjusted such that the exhaust gas coming from the engine has combustible constituents, and wherein air is supplied to the exhaust gas with the combustible constituents in the exhaust gas system in order to obtain a combustible mixture,
   wherein the air is fed at a position downstream of the first catalyst device, and
   wherein at least two bends are provided in a flow of the exhaust gas between the position at which the air is fed and a position at which the exothermal reaction takes place.

3. A system for catalytic aftertreatment of exhaust gas of an internal-combustion engine, comprising:
   first and second spatially separate catalyst devices, the first catalyst device being arranged in a position close to the engine, and the second catalyst device being arranged in a position away from the engine, and
   a reaction chamber arranged in front of the second catalyst device for causing an exothermal reaction to take place for heating the second catalyst device,
   wherein a feeding device is provided for feeding air at a position upstream of the first catalyst device, and
   wherein the feeding device has a pipe which extends into an exhaust pipe and which has a slotted pipe shell.

4. The system according to claim 3, wherein the pipe which extends into the exhaust pipe is arranged essentially perpendicular to the flow direction of the exhaust gas.

5. A system for catalytic aftertreatment of exhaust gas of an internal-combustion engine, comprising:
   first and second spatially separate catalyst devices, the first catalyst device being arranged in a position close to the engine, and the second catalyst device being arranged in a position away from the engine, and
   a reaction chamber arranged in front of the second catalyst device for causing an exothermal reaction to take place for heating the second catalyst device,
   wherein a feeding device is provided for feeding air at a position upstream of the first catalyst device, and
   wherein at least two bends are provided in exhaust gas flow between the feeding device and the reaction chamber.

6. A system for catalytic aftertreatment of exhaust gas of an internal-combustion engine, comprising:
   first and second spatially separate catalyst devices, the first catalyst device being arranged in a position close to the engine, and the second catalyst device being arranged in a position away from the engine, and
   a reaction chamber arranged in front of the second catalyst device for causing an exothermal reaction to take place for heating the second catalyst device,
   wherein a feeding device is provided for feeding air at a position downstream of the first catalyst device, and
   wherein the feeding device has a pipe which extends into an exhaust pipe and which has a slotted pipe shell.

7. The system according to claim 5, wherein the pipe which extends into the exhaust pipe is arranged essentially perpendicular to the flow direction of the exhaust gas.

8. A system for catalytic aftertreatment of exhaust gas of an internal-combustion engine, comprising:
   first and second spatially separate catalyst devices, the first catalyst device being arranged in a position close to the engine, and the second catalyst device being arranged in a position away from the engine, and
   a reaction chamber arranged in front of the second catalyst device for causing an exothermal reaction to take place for heating the second catalyst device,
   wherein a feeding device is provided for feeding air at a position downstream of the first catalyst device, and
   wherein at least two bends are provided in exhaust gas flow between the feeding device and the reaction chamber.

* * * * *